United States Patent [19]
Fujita

[11] Patent Number: 5,948,070
[45] Date of Patent: Sep. 7, 1999

[54] FILE TRANSFER SYSTEMS, FILE TRANSFER METHODS AND STORAGE MEDIA FOR STORING FILE TRANSFER PROGRAMS

[75] Inventor: Tomoo Fujita, Tokyo, Japan

[73] Assignee: NEC Corporation, Tokyo, Japan

[21] Appl. No.: 08/741,902

[22] Filed: Oct. 31, 1996

[30] Foreign Application Priority Data

Oct. 31, 1995 [JP] Japan ................................ 7-326180

[51] Int. Cl.⁶ ............................ G06F 13/14; G06F 13/38; G06F 15/17
[52] U.S. Cl. .......................... 709/243; 709/200; 709/238
[58] Field of Search ..................... 395/200.31, 200.42, 395/200.44, 200.46, 200.48, 200.57, 200.68, 200.73, 200.79, 730; 707/8, 10, 200, 203, 511; 709/201, 212, 214, 216, 218, 227, 238, 243, 247

[56] References Cited

U.S. PATENT DOCUMENTS

| | | | |
|---|---|---|---|
| 5,093,779 | 3/1992 | Sakurai | 395/600 |
| 5,555,100 | 9/1996 | Bloomfield et al. | 358/402 |
| 5,640,504 | 6/1997 | Johnson, Jr. | 395/182.02 |
| 5,740,231 | 4/1998 | Cohn et al. | 379/89 |
| 5,757,669 | 5/1998 | Christie et al. | 364/514.006 |

FOREIGN PATENT DOCUMENTS

3-211646  9/1991  Japan .

*Primary Examiner*—Mark H. Rinehart
*Assistant Examiner*—Marc D. Thompson
*Attorney, Agent, or Firm*—Young & Thompson

[57] ABSTRACT

For broadcasting a file to communication processing systems E, F, H, I, J and K, a communication processing system A sends the file and destinations E, H and I to the communication processing system B, and the file and destinations F, J and K to the communication processing system C. Of the sent destinations E, H and I, the communication processing system B delivers the file to the communication processing system E for which the system B is responsible for delivering the file, and for the other destinations, sends the file and the file destinations H and I to the relaying communication processing system D.

3 Claims, 8 Drawing Sheets

A; Sending communication processing system
B,C,D,G; Relaying communication processing system
E,F,H,I,J,K; Receiving communication processing system

5 Relay information table

| Receiver | Destination |
|----------|-------------|
| B | D,E,H,I |
| C | F,G,J,K |

| Receiver | Destination |
|----------|-------------|
| D | H,I |

FIG. 5

| Receiver | Destination |
|----------|-------------|
| G | J,K |

FILE TRANSFER SYSTEMS, FILE TRANSFER METHODS AND STORAGE MEDIA FOR STORING FILE TRANSFER PROGRAMS

BACKGROUND OF THE INVENTION

1. Field of the Invention

The present invention relates to file transfer systems and methods for broadcasting files from file-sending communication processing systems to a plurality of receiving communication processing systems via relaying communication processing systems, and to a storage media for storing file transfer programs.

2. Description of the Related Art

According to the prior art for communications between communication processing systems such as personal computers and work stations, the file to be broad-cast is sent from a sending communication processing system to each of a plurality of receiving communication processing systems.

Therefore, the prior art technique mentioned above, which involves sending a file to each of a plurality of receiving communication processing systems even in cases where the receiving systems are located in one remote area, incurs a heavy communications cost.

As a solution to the problem, Japanese Unexamined Patent Application Disclosure HEI 3-211646 suggests installing a relaying communication processing system in one remote area in cases where a plurality of receiving communication processing systems are located therein, and describes a technique of transferring a file and the destinations thereof (broadcast-receiving sides) from a sending communication processing system to the relaying communication processing system so that the relaying communication processing system sends the file to the communication processing systems in the area based on the received information on the destinations.

The technique described in Japanese Unexamined Patent Application Disclosure HEI 3-211646, however, has the problem of significantly increasing the processing time necessary for transferring the file, since the relaying communication processing system, installed between the sending communication processing system and the plurality of receiving communication processing systems, is put under a focused heavy load due to sending of the file from the relaying communication processing system to all the receiving communication processing systems.

A solution to the foregoing problem, which suggests installing an increased number of relaying communication processing systems, results in a heavier load on the sending communication processing system, and thus in a significantly increased processing time necessary for transferring the file as well, since the sending communication processing system must transfer the file and the destinations thereof to all the relaying communication processing systems.

SUMMARY AND OBJECTS OF THE INVENTION

It is an object of the present invention to allow efficient broadcasting of a file from processing system to a plurality of other communication processing systems.

It is another object of the present invention to allow efficient broadcasting of a file without increasing the load on the sending communication processing system, even in cases where an increased number of receiving communication processing systems are installed.

A first file transfer system according to the present invention is a file transfer system for broadcasting a file from a sending communication processing system to a plurality of receiving communication processing systems via at least one relaying communication processing system, which comprises the following requirements:

the sending communication processing system includes first file destination-sorting means and first file transfer processing means;

the first file destination-sorting means inputs a broadcast request, including the name of the file to be broadcasted and a plurality of the file destinations, and determines at least one relaying communication processing system to which the file is to be sent;

the first file transfer processing means sends the file and the plurality of the file destinations, to each of the relaying communication processing systems determined by the first file destination-sorting means;

the relaying communication processing systems each have second file destination-sorting means and second file transfer processing means;

the second file destination-sorting means determines the lower-order relaying communication processing systems to which the file and the destinations for which the respective lower-order relaying communication processing systems are responsible for sending the file, of the plurality of the file destinations sent from the sending communication processing system, are to be sent; and the second file transfer processing m sends the file to the receiving communication processing systems for which the higher-order relaying communication processing system is responsible for sending the data, of the plurality of the file destinations sent from the sending communication processing system, and concurrently sends the received file and the file destinations to the lower-order relaying communication processing systems determined by the second file destination-sorting means, for the receiving communication processing systems for which the higher-order relaying communication processing system is not responsible for directly sending the data.

A second file transfer system according to the present invention is constructed by the addition of the following requirements to the first file transfer system:

the sending communication processing system additionally includes a first relay information table which indicates the relationship between the file destinations to which the sending communication processing system may have to send the file and the relaying communication processing systems to which the file is sent; and the first file destination-sorting means inputs a broadcast request, including the name of the file to be broadcasted and a plurality of the file destinations, and determines at least one lower-order relaying communication processing system to which the file designated in the broadcast request is to be sent, on the basis of the relay information stored in the first relay information table and the plurality of the file destinations included in the broadcast request.

A third file transfer system according to the present invention is constructed by the addition of the following requirements to the second file transfer system:

the relaying communication processing systems each include a connection information table which stores connection information on the relationship between the relaying communication processing system and the at least one receiving communication processing system to which the relaying communication processing system directly sends the file, and a second relay information table which stores at least one file destination to which the relaying communication processing system may send the file and the lower-order relaying communication processing system and the relaying communication processing system to which the file is sent;

the second file destination-sorting means determines at least one lower-order relaying communication processing system to which the file is to be sent, on the basis of the file destinations and the relay information stored in the relay information table, for the destinations which are not the communication processing systems included in the connection information stored in the connection information table, of the plurality of the file destinations sent from the sending communication processing system; and the second file transfer processing means sends the file to the receiving communication processing systems included in the connection information stored in the connection information table, of the plurality of the file destinations sent from the sending communication processing system, and concurrently sends the received file and the file destinations to the lower-order relaying communication processing systems determined by the second file destination-sorting means, for the receiving communication processing systems for which the higher-order relaying communication processing system is not responsible for directly sending the data.

A first file transfer method according to the present invention is a file transfer method of broadcasting a file from a sending communication processing system to a plurality of receiving communication processing systems via at least one relaying communication processing system, which comprises the following procedures:

the sending communication processing system inputs a broadcast request, including the name of the file to be broadcasted and a plurality of the file destinations, determines at least one relaying communication processing system to which the file is to be sent, and sends the file and the plurality of the file destinations to each of the determined relaying communication processing systems; and the relaying communication processing systems each send the file to the receiving communication processing systems for which the relaying communication processing system is responsible for directly sending the data, of the plurality of the file destinations sent from the sending communication processing system, and for the other file destinations, determines at least one lower-order relaying communication processing system to which the file is to be sent on the basis of the file destinations, to send the received file and the file destinations to each of the determined lower-order relaying communication processing systems.

A second file transfer method according to the present invention comprises the following procedure which is added to the first file transfer method:

the sending communication processing system holds relay information on the relationship between at least one file destination to which the sending communication processing system may have to send the file and the relaying communication processing system to which the file is sent, inputs a broadcast request, including the name of the file to be broadcasted and a plurality of the file destinations to which the file is sent, and determines at least one relaying communication processing system to which the file designated in the broadcast request is to be sent, on the basis of the relay information and the plurality of the file destinations included in the broadcast request, to send the file and the plurality of the file destinations to which the file is sent, to each of the determined relaying communication processing systems.

A third file transfer method according to the present invention comprises the following procedure which is added to the second file transfer method:

the relaying communication processing systems each hold connection information on the relationship between the relaying communication processing system and the receiving communication processing system to which the relaying communication processing system directly sends the file, and relay information on the relationship between at least one file destination to which the relaying communication processing system may send the file and the relaying communication processing system to which the file is sent, and send the file to the receiving communication processing systems designated in the destinations, for the destinations included in the connection information, of the plurality of the destinations sent from the sending communication processing system, while for the other destinations, determine at least one lower-order relaying communication processing system to which the file is to be sent, on the basis of the file destinations and the relay information, and send the received file and the plurality of the file destinations to which the file is sent, to each of the determined relaying communication processing systems.

A first computer-readable storage memory according to the present invention stores a program for the execution by the file-sending communication processing system of the process of inputting a broadcast request, which includes the name of the file to be broadcasted and a plurality of the file destinations, determining at least one relaying communication processing system to which the file is to be sent, and sending the file and the plurality of the file destinations to each of the determined relaying communication processing systems, and a program for the execution by at least one of the relaying communication processing systems of the process of sending the file to the receiving communication processing systems for which the relaying communication processing system is responsible for directly sending the data, of the plurality of the file destinations sent from the sending communication processing system, and for the other file destinations, determining at least one lower-order relaying communication processing system to which the file is to be sent on the basis of the file destinations, to send the received file and the file destinations to each of the determined lower-order relaying communication processing systems.

A second computer-readable storage memory according to the present invention stores, in addition to the contents of the first storage memory, a program for the execution by the sending communication processing system of the process of holding relay information on the relationship between at least one file destination to which the sending communication processing system may send the file and the relaying communication processing system to which the file is sent, inputting a broadcast request, which includes the name of the file to be broadcasted and a plurality of the file destinations to which the file is sent, and determining at least one relaying communication processing system to which the file designated in the broadcast request is to be sent, on the basis of the relay information and the plurality of the file destinations included in the broadcast request, to send the file and the plurality of the file destinations to which the file is sent, to each of the determined relaying communication processing systems.

A third computer-readable storage memory according to the present invention stores, in addition to the contents of the second storage memory, a program for the execution by the relaying communication processing system of the process of holding connection information on the relationship between the relaying communication processing system and the receiving communication processing system to which the relaying communication processing system directly sends the file, and relay information on the relationship between at least one file destination to which the relaying communication processing system may send the file and the relaying communication processing system to which the file is sent, and sending the file to the receiving communication processing systems designated in the destinations, for the destinations included in the connection information, of the plurality of the destinations sent from the sending communication processing system, while for the other destinations, determining at least one lower-order relaying communication processing system to which the file is to be sent, on the basis of the file destinations and the relay information, and sending the received file and the plurality of the file destinations to which the file is sent, to each of the determined relaying communication processing systems.

BRIEF DESCRIPTION OF THE DRAWINGS

The invention will be understood more fully from the detailed description given here below and from the accompanying drawings of preferred embodiments of the invention, which, however, should not be considered as limiting the invention but are for explanation and understanding only.

Here, it should be noted that like reference numerals represent like elements throughout the disclosure.

DETAILED DESCRIPTION OF THE PREFERRED EMBODIMENTS

Embodiments of the present invention will now be described with reference to the drawings.

Figure 1:
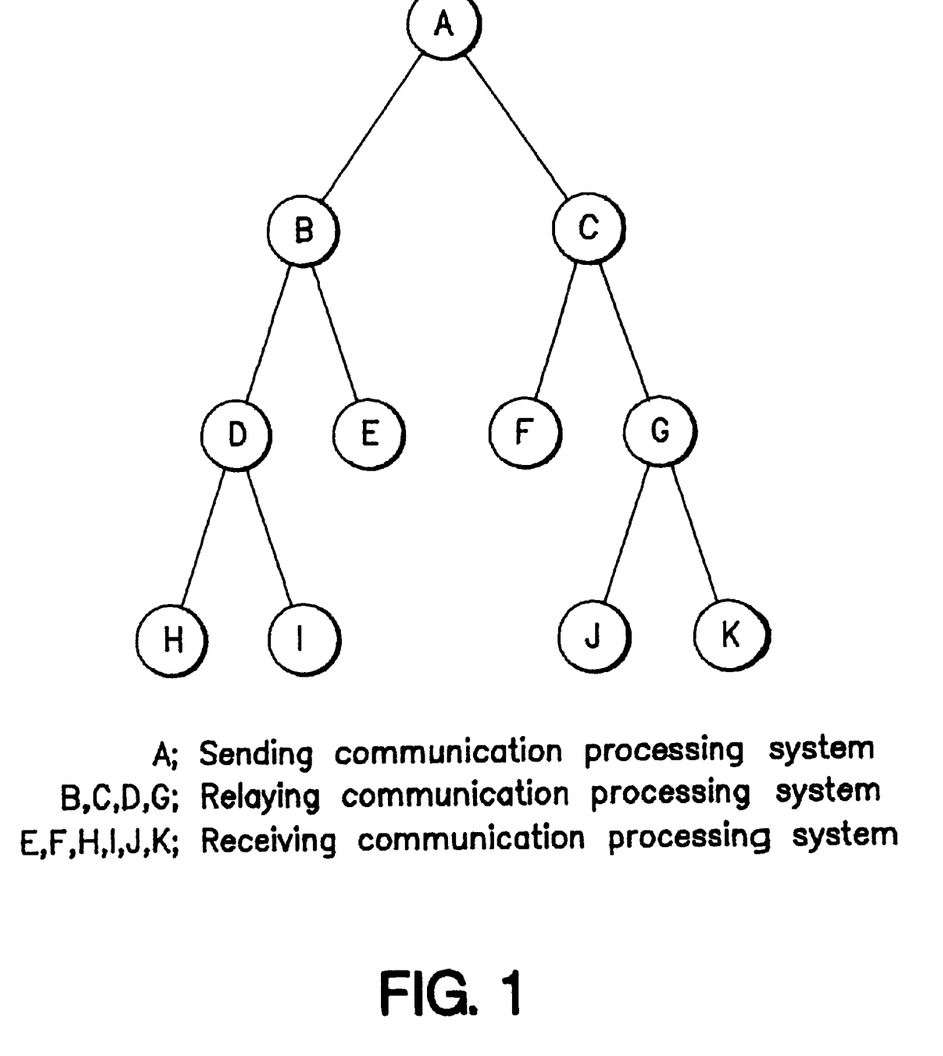
FIG. 1 is a block diagram illustrative of an embodiment of the present invention.

FIG. 1 is an illustration of an example of the entire configuration of a system to carry out a file transfer method according to the present invention, constructed of a file-sending communication processing system (sending communication processing system) A, relaying communication processing systems B, C, D and G, and file-receiving communication processing systems (receiving communication processing systems) E, F, H, I, J and K.

The sending communication processing system A has the function of determining, on the basis of a plurality of destinations included in a broadcast request, the relaying communication processing systems to which the file designated in the broadcast request, and sending to each of the determined relaying communication processing systems the file and the destinations to which the file is sent via the relaying communication processing systems,designated in the broadcast request.

The relaying communication processing systems B and C have the function of directly delivering the file to communication processing systems E and F, respectively, for which the relaying communication processing systems B and C are responsible for sending the file, of the destinations sent from the sending communication processing system A, and for the other destinations, determining relaying communication processing systems D and G, respectively, on the basis of the destinations, to send, to the determined relaying communication processing systems D and G, respectively, the received file and the destinations to which the file is to be transferred via the communication processing systems D and G, respectively.

On the other hand, the relaying communication processing systems D and G have the function of transferring the received file to the destinations sent from the systems B and C, respectively. Receiving communication processing systems E, F, H, I, J and K have the function of receiving the sent file, and other functions.

Figure 2:
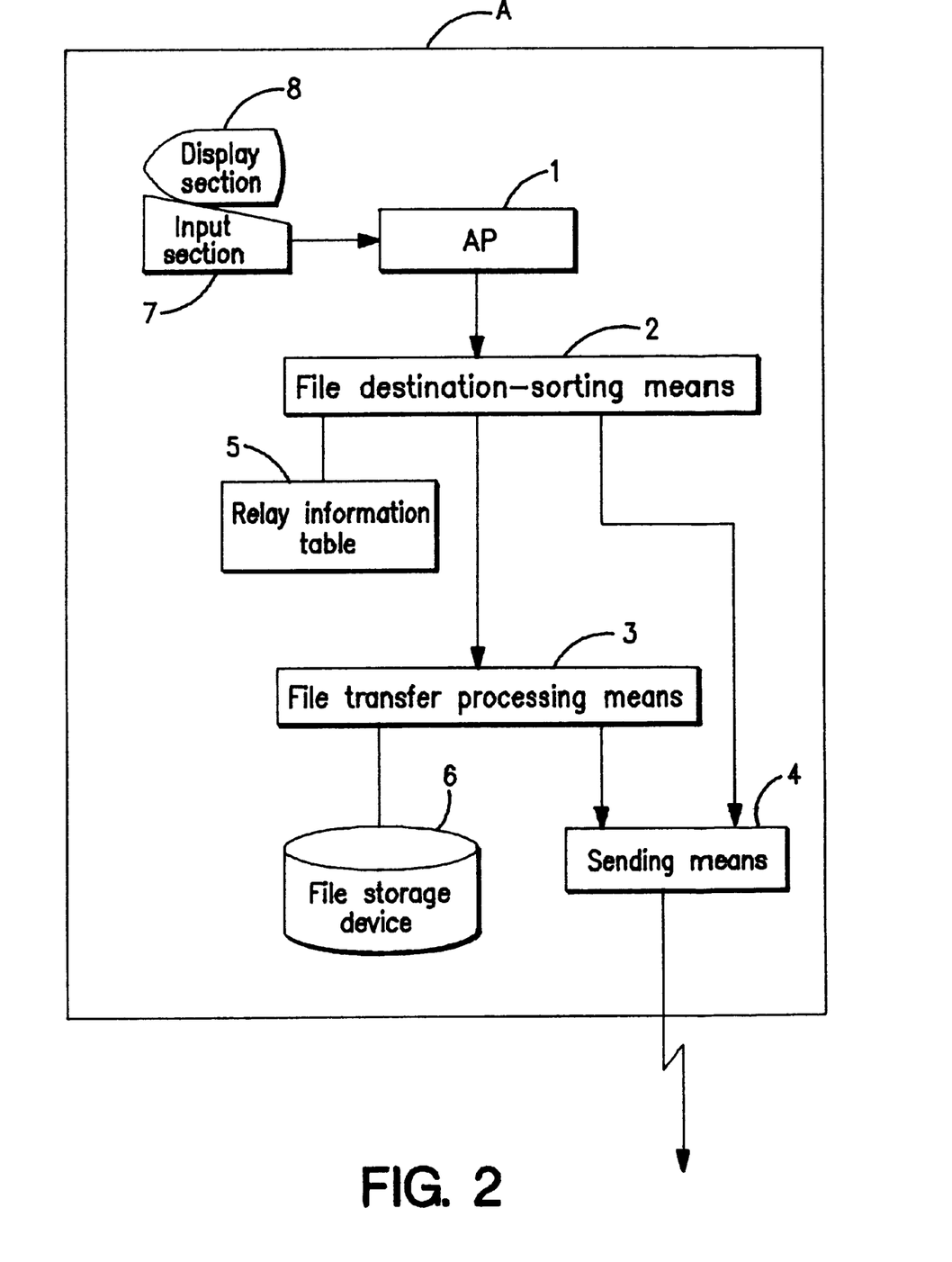
FIG. 2 is a block diagram illustrative of an example of the configuration of a sending communication processing system A according to the embodiment of the present invention.

FIG. 2 is a block diagram illustrative of an example of the configuration of the sending communication processing system A which is equipped with an application program (AP) 1, file destination-sorting means 2, file transfer processing means 3, sending means 4, a relay information table 5, a file storage device 6, an input section 7 such as a keyboard, and a display section 8 such as a CRT.

The application program 1 has the function of issuing to the file destination-sorting means 2 a file transfer request, including the name and the destination (s) of the file to be broad-cast, etc. which have been included in a broadcast request input by the operator with the input section 7.

Figure 3:
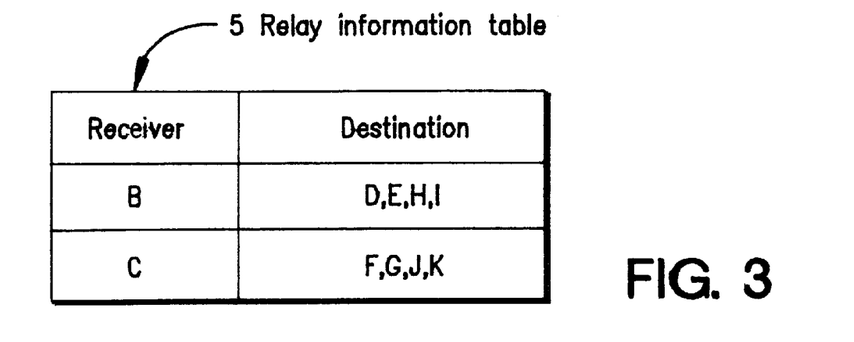
FIG. 3 is an illustration of the contents of a relay information table 5 according to the embodiment of the present invention.

The relay information table 5 stores relay information on the relationship between all the possible destinations to which the sending communication processing system A transfers the file, and the relaying communication processing systems to which the sending communication processing system A sends the file. FIG. 3 is an illustration of an example of the contents of the relay information table 5. In the present example, it is designed so that the file to be transferred to the receiving communication processing systems D, E, H and I is sent to the relaying communication processing system B, while the file to be transferred to the receiving communication processing systems F, G. J and K is sent to the relaying communication processing system C.

The relay information table 5 is created on a hard disk device, for example. Here, the methods of storing relay information in the relay information table 5 include, for example, one by which a floppy disk storing the relay information to be stored in the relay information table 5 is distributed to the sending communication processing system A, and the relay information stored on the distributed floppy disk is stored in the relay information table 5 on a hard disk device, one by which a file of the relay information to be set in the relay information table 5 is transferred from a predetermined communication processing system to the sending communication processing system A, and the transferred relay information is stored in the relay information table 5, etc.

The file destination-sorting means 2 has the function of determining a relaying communication processing system to which a file to be broadcasted is to be sent, on the basis of the file transfer request from the application program 1 and the contents of the relay information table 5, the function of producing control information (on the sender, the destinations and the name of the file to be transferred) per relaying communication processing system to which the file is sent, and sending each control information produced to each receiver, and the function of making a file transfer request (including the designation of the receivers, and the name of the file to be transferred), and issuing the file transfer request made to the file transfer processing means 3.

The file transfer processing means 3 has the function of transferring, to the designated receivers, the file designated by the file transfer request passed from the file destination-sorting means 2.

Figure 4:
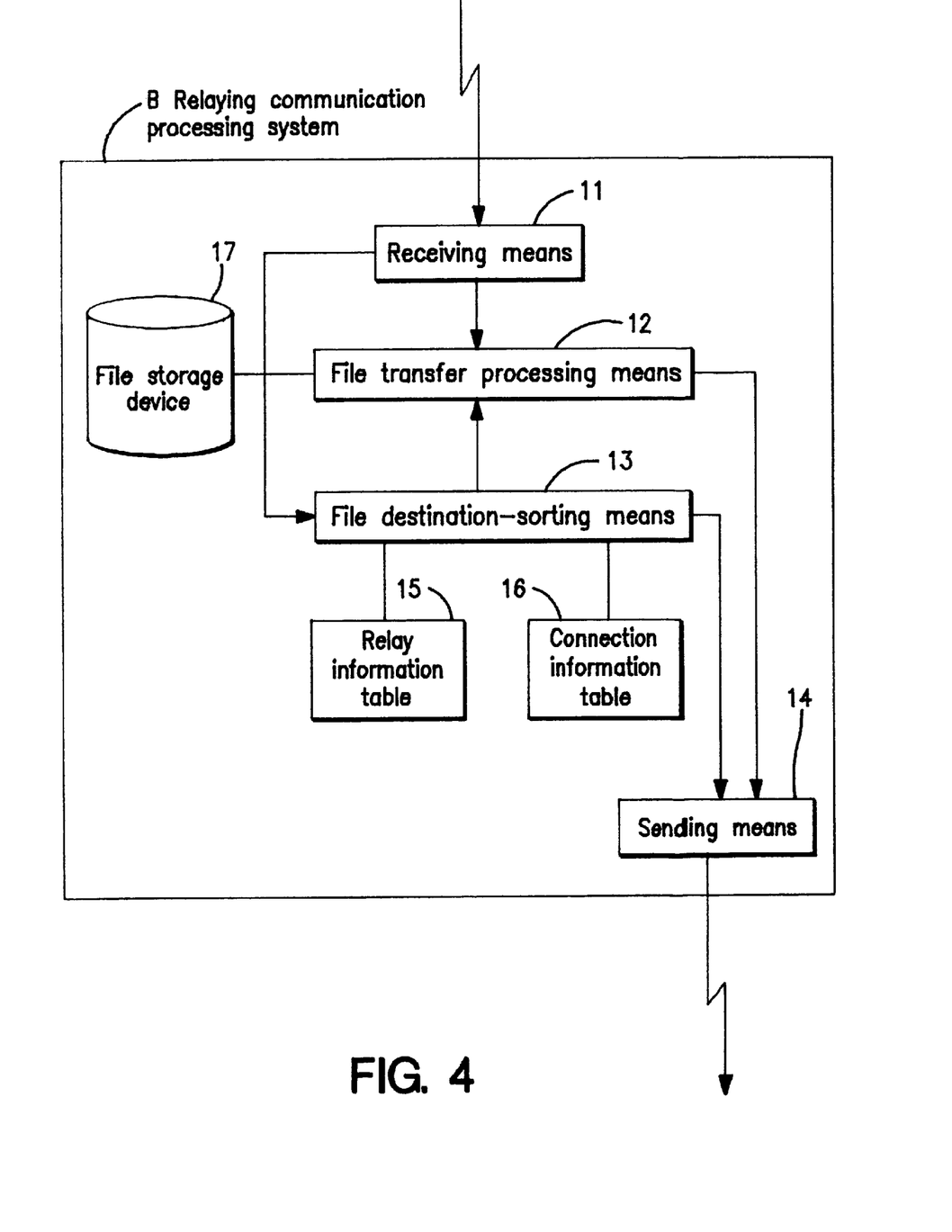
FIG. 4 is a block diagram illustrative of an example of the configuration of a sending communication processing system B according to the embodiment of the present invention.
Figure 5:
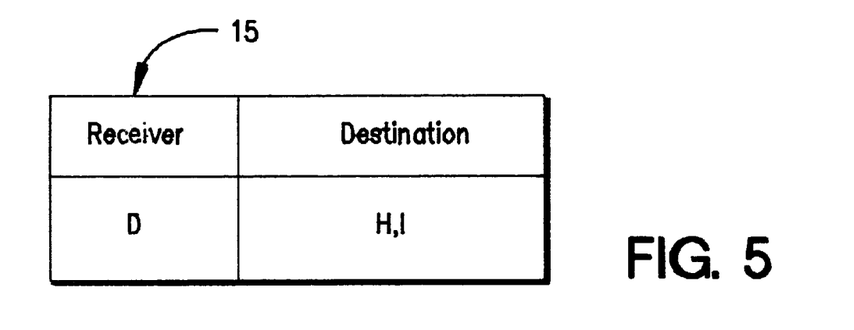
FIG. 5 is an illustration of the contents of a relay information table 15 according to the embodiment of the present invention.
Figure 6:
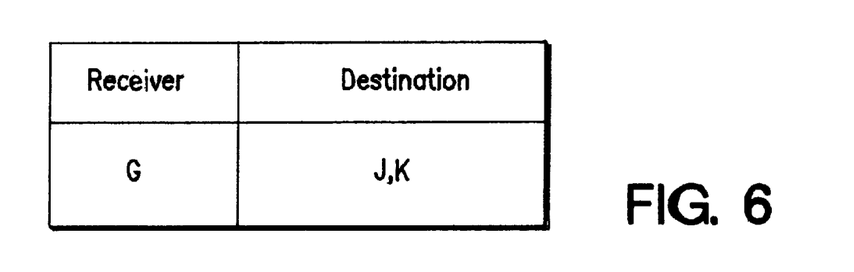
FIG. 6 is an illustration of the contents of a relay information table which is included in a relaying communication processing system C according to the embodiment of the present invention.

FIG. 4 is a block diagram illustrative of an example of the configuration of the relaying communication processing system B to which the relaying communication processing system D is connected, and which is equipped with receiving means 11, file transfer processing means 12, file destination-sorting means 13, sending means 14, relay information table 15, a connection information table 16 and a file storage device 17. Here, it is to be noted that the other relaying communication processing system C, to which the relaying communication processing system G is connected, is configured in a like manner. The relay information table 15 stores relay information of the relationship between the file destinations and the relaying communication processing system D to which the relaying communication processing system B sends the file for transferring the file to the destinations. FIG. 5 is an illustration of an example of the contents of the relay information table 15. The example illustrated in FIG. 5 is designed so that the file addressed to H and I is sent to the relaying communication processing system D. Here, it is to be noted that the relay information table provided in the relaying communication processing system C stores such relay information as illustrated in FIG. 6. The example illustrated in FIG. 6 is designed so that the file addressed to J and K is sent to the relaying communication processing system G.

The connection information table 16 stores the system name E of the receiving communication processing system directly connected to the relaying communication processing system B.

The file destination-sorting means 13 has the function of issuing, to the file transfer processing system 12, a file transfer request for transferring the file to the receiving communication processing system E when the destinations included in the received control information contain the receiving communication processing system E which is connected to the system B, the function of determining all the relaying communication processing systems which may be alternatives to the receiving communication processing systems H and I when the destinations included in the received control information contain the receiving communication processing systems H and I which are not directly connected to the system B, the function of producing control information (on the sender, the destinations and the name of the file to be transferred) per relaying communication processing system, and sending each control information produced to each relaying communication processing system, and the function of making a file transfer request (including the designation of the receivers, and the name of the file to be transferred) per relaying communication processing system, and issuing the file transfer request made to the file transfer processing means 12.

The file transfer processing means 12 has the function of storing the received file in the file storage device 17, and the function of transferring the file in reply to the file transfer request from the file destination-sorting means 13.

Figure 7:
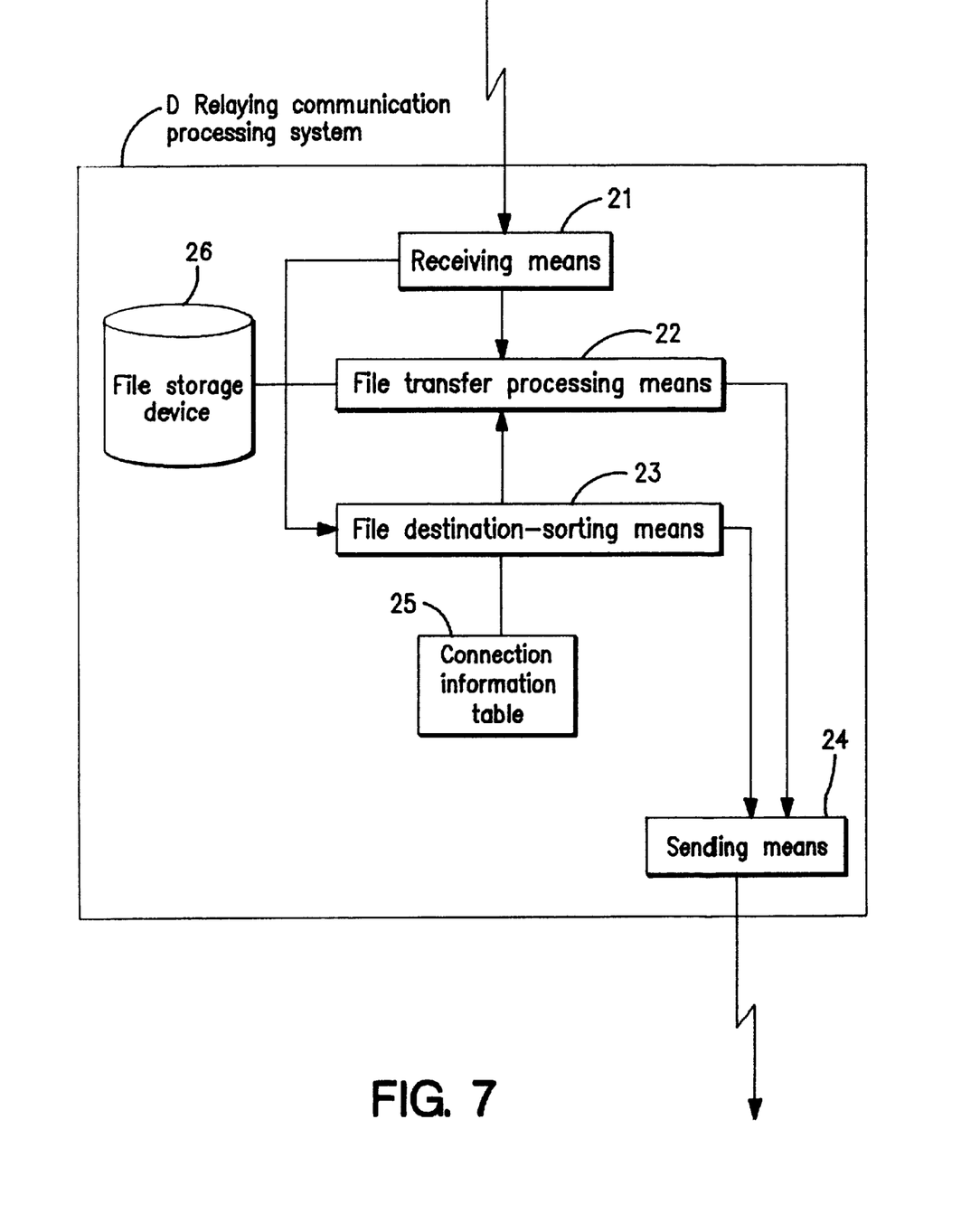
FIG. 7 is a block diagram illustrative of an example of the configuration of a sending communication processing system D according to the embodiment of the present invention.

FIG. 7 is a block diagram illustrative of an example of the configuration of the relaying communication processing system D to which no relaying communication processing system is connected, and which is equipped with receiving means 21, file transfer processing means 22, file destination-sorting means 23, sending means 24, a connection information table 25 and a file storage device 26. Here, it is to be noted that the other relaying communication processing system G to which no relaying communication processing system is connected is configured in a like manner.

The connection information table 25 stores the system names H and I of the receiving communication processing systems which are connected to the system D.

The file destination-sorting means 23 have the function of issuing, to the file transfer processing system 22, a file transfer request for transferring the file to the destinations included in the control information, and other functions.

The file transfer processing system 22 has the function of storing the received file in the file storage device 26, and the function of sending the file in reply to the file transfer request from the file destination-sorting means 23.

Figure 8:
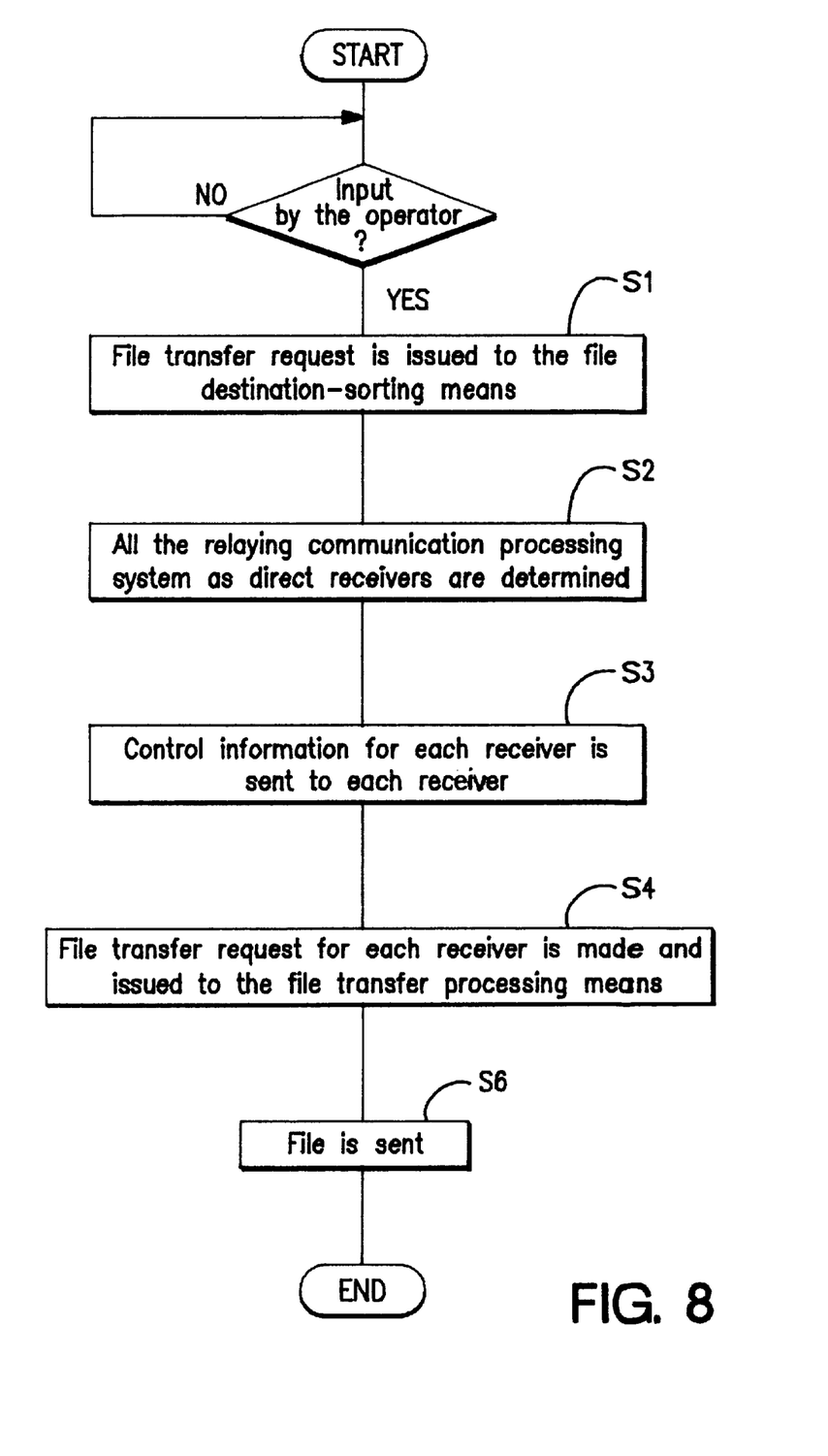
FIG. 8 is a flow chart illustrative of the processing by the sending communication processing system A according to the embodiment of the present invention.
Figure 9:
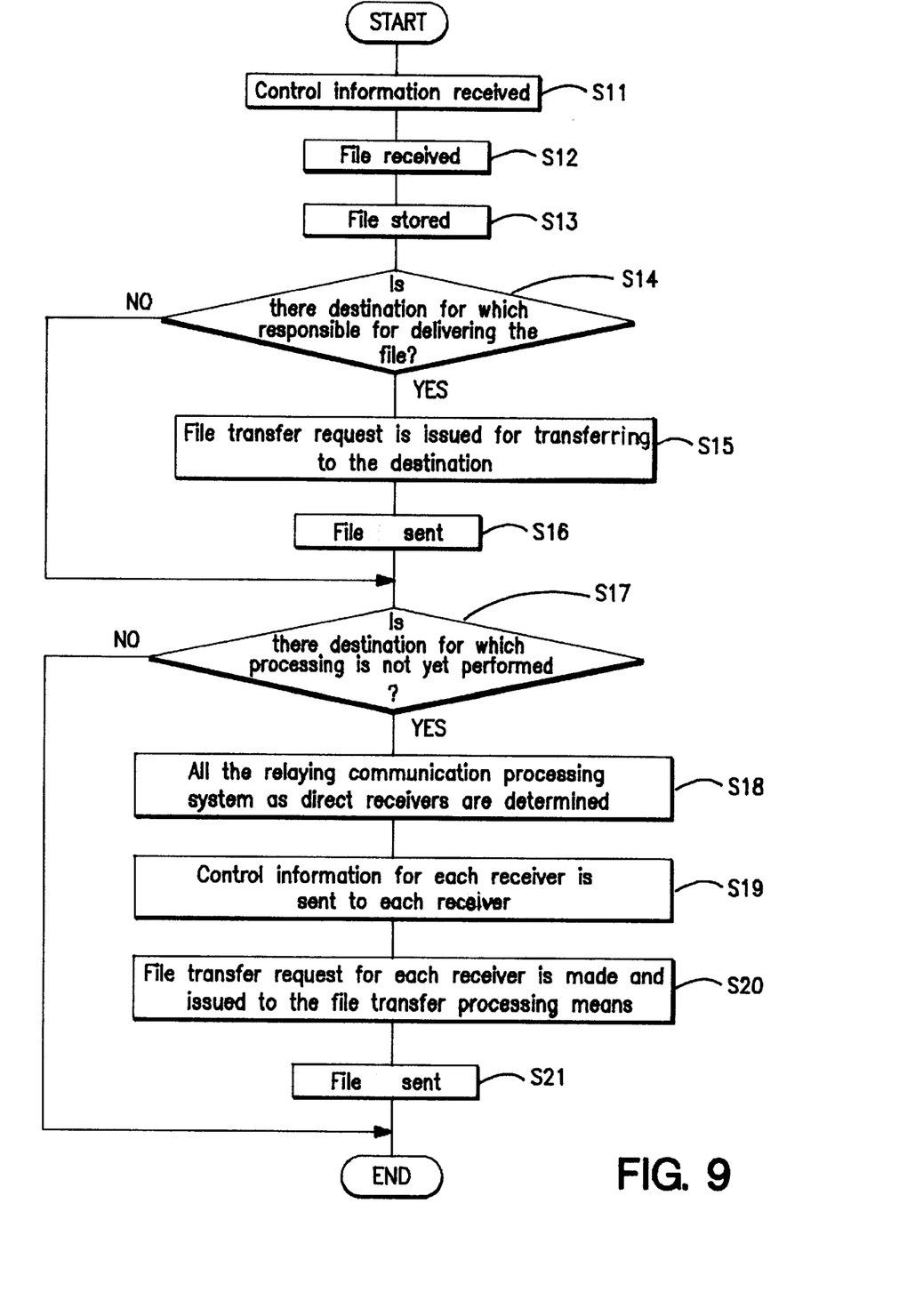
FIG. 9 is a flow chart illustrative of the processing by the relaying communication processing systems B and C according to the embodiment of the present invention.

FIG. 8 is a flow chart illustrative of the processing by the sending communication processing system A, and FIG. 9 is a flow chart illustrative of the processing by the relaying communication processing systems B and C to which other relaying communication systems are connected. The operation according to the present embodiment will now be described with reference to the respective drawings.

The operator of the sending communication processing system A inputs, with the input section 7, a broadcast request which includes, for example, the file name "data", and the destinations E, F, I, J and K, in cases where the file named "data" is to be broadcasted to the receiving communication processing systems E, F, I, J and K.

The application program 1, when a broadcast request is input with the input section 7 (FIG. 8, S1), issues a file transfer request, including the following information, to the file destination-sorting means 2 (S2).

Sender: A
Destinations: E, F, H, I, J, and K
File Name: data

The file destination-sorting means 2, upon receipt of the file transfer request from the application program 1, determines all the relaying communication processing systems to which the file is to be sent, on the basis of the destinations E, F, H, I, J and K included in the file transfer request, and the relay information stored in the relay information table 5 shown in FIG. 3 (S3). In the present example, since B is set as the receiver for the destinations E, H and I, and C as the receiver for the destinations F, J and K, the file destination-sorting means 2 determines the relaying communication processing systems B and C to be the receivers of the file.

Thereafter, the file destination-sorting means 2 produces control information which contains the information listed in (1) below for controlling the file transfer operation by the relaying communication processing system B, and control information which contains the information listed in (2) below for controlling the file transfer operation by the relaying communication processing system C, and sends the produced control information to the relaying communication processing systems B and C via the sending means 4.
(1) Control information to be sent to the relaying communication processing system B
Sender: A
Destinations: E, H and I
Name of the file to be transferred: data
(2) Control information to be sent to the relaying communication processing system C
Sender: A
Destinations: F, J and K
Name of the file to be transferred: data Here, the method of providing of the control information is not limited to the method described above, and may be one by which the control information is contained in part of the file, one by which the control information is contained in a file transfer command, one by which the sending is performed using a different path, etc.

Thereafter, the file destination-sorting means 3 makes a file transfer request which includes the information indicated in (3) and (4) below for each of the relaying communication processing systems B and C as the file receivers, and issues the file transfer requests made to the file transfer processing means 3 (S5).
(3) File transfer request to the relaying communication processing system B
Receiver: B
Name of the file to be transferred: data
(4) File transfer request to the relaying communication processing system C
Receiver: C
Name of the file to be transferred: data The file transfer processing means 3, upon receipt of the two file transfer requests mentioned above from the file destination-sorting means 2, reads the file named "data" from the file storage device 6, and sends the read file to the relaying communication processing systems B and C via the sending means 4.

The control information sent from the sending communication processing system A to the relaying communication processing system B is received by the file destination-sorting means 13 via the receiving means 11 of the relaying communication processing system B shown in FIG. 4 (FIG. 9, S11), and the file named "data" is received by the file transfer processing means 12 via the receiving means 11 (S12).

The file transfer processing means 12 stores the received file in the file storage device 17 (S13).

In addition, the file destination-sorting means 13, upon receipt of the control information containing the information listed in (1) above, refers to the connection information table 16 to judge whether there exist the receiving communication processing systems for which the system B is responsible for directly delivering the file, that is, the receiving communication processing systems which are directly connected to the system B, in the destinations (S14).

In the present example, since the destinations included in the control information described above are E, H and I, and the receiving communication processing system E is the receiving communication processing system connected to the system B, the file destination-sorting means issues a file transfer request, including the information listed in (5) below, to the file transfer processing means 12, and sends information notifying the receiving communication processing system E of the file sender being A via the sending means 14 (S15).
(5) File transfer request to the communication processing system E
Receiver: E
Name of the file to be transfer: data The file transfer processing means 12, upon receipt of the file transfer request described above, reads the file named "data" from the file storage device 17, and sends the read file to the receiving communication processing system E via the sending means 14 (S16). The receiving communication processing system E receives the file from the relaying communication processing system B and stores the file in the file storage device in the system E.

Thereafter, the file destination-sorting means 3 judges whether there exist destinations in the destinations E, H and I included in the control information above, for which no processing is carried out (S17). In the present example, since the file transfer processing has been completed only for the destination E of the destinations E, H and I above, the judgment in S17 is "YES", and the process in S18 is carried out. Here, the processing is finished when no destination for which the processing has not yet been carried out is judged in S17 to exist.

In S18, the relay information table is referred to, to determine the relaying communication processing systems to which the system B sends the file for transferring the file to the destinations H and I which are not connected to the system B, and for which no processing has been performed (S18). In the present example, since the relaying communication processing system D is set as the receiver for the destinations H and I, as illustrated in FIG. 5, the file destination-sorting means 13 determines the relaying communication processing system D to be the direct receiver of the file.

Thereafter, the file destination-sorting means 13 produces control information which contains the information listed in (6) below for controlling the file transfer operation by the relaying communication processing system D, and sends the produced control information to the relaying communication processing system D via the sending means 14.
(6) Control information to be sent to the relaying communication processing system D
Sender: A
Destinations: H and I
Name of the file to be transferred: data Thereafter, the file destination-sorting means 13 makes a file transfer request, which includes the information listed in (7) below, for transferring the file to the relaying communication processing system D as the direct receiver of the file, and issues the file transfer request made to the file transfer processing means 12 (S20).
(7) File transfer request to the relaying communication processing system D Receiver: D
Name of the file to be transferred: data The file transfer processing means 12, upon receipt of the file transfer request mentioned above, reads the file named "data" from the file storage device 17, and sends the read file to the relaying communication processing system D via the sending means 14.

The control information sent from the relaying communication processing system B to the relaying communication processing system D, which contains the destinations H and I, is received by the file destination-sorting means 23 via the receiving means 21, and the file named "data" is received by the file transfer processing means 22 via the receiving means 21 of the relaying communication processing system D shown in FIG. 7.

The file transfer processing means 22 stores the received file in the file storage device 26.

In addition, the file destination-sorting means 23, upon receipt of the control information described above which includes the destinations H and I, makes a file transfer request for transferring the file named "data" to the receiving communication processing system H and a file transfer request for transferring the file named "data" to the receiving communication processing system I, and further issues these requests to the file transfer processing means 22 while notifying the receiving communication processing systems H and I of the file sender being A via the sending means 24.

Responding to the two file transfer requests from the file destination-sorting means 23, the file transfer processing means 22 reads the file named "data" from the file storage device 26, and sends the read file to the receiving communication processing systems H and I via the sending means 24.

Here, although no description is given in the foregoing embodiment, the relaying communication processing systems C and G function in the same manner as their counterpart relaying communication processing systems B and D, and the receiving communication processing systems J and K function in the same manner as the communication processing systems H and I. In addition, the relaying communication processing systems B, C, D and G, though being designed to perform only relay processing according the embodiment described above, can be file destinations, in which case the systems perform both relay processing and receive processing for the file.

As described above, the present invention has the effect of allowing a file to be sent to all of a plurality of relaying communication processing systems only by sending the file to one of the plurality of relaying communication processing systems from a file-sending communication processing system, since it is designed so that when the file to be broadcasted and the file destinations are sent to the relaying communication processing systems, each of the relaying communication processing systems delivers the file to the destinations for which the system is responsible for delivering the file, and inquires the lower-order relaying communication processing systems which are responsible for the other destinations to send the file and its destinations thereto. Accordingly, the present invention has the additional effect of lowering the load on the sending communication processing system as compared with the prior art technique which needs to directly send the file from the sending communication processing system to all the relaying communication processing systems, since it is possible to transfer the file to all the relaying communication processing systems by sending the file from the sending communication processing system to only one relaying communication processing system which is directly connected to the sending communication processing system even in cases where the number of the receiving communication processing systems increases, and thus the number of the relaying communication processing systems increases.

In addition, since the relaying communication processing systems may be connected in a multistage configuration, the communications time and the communications cost of the entire system may be reduced by appropriately locating the relaying communication processing systems, and establishing the connection relationship between or among the relaying communication processing systems, depending on the conditions of the areas in which the broadcast-receiving communication processing systems are installed.

Figure 10:
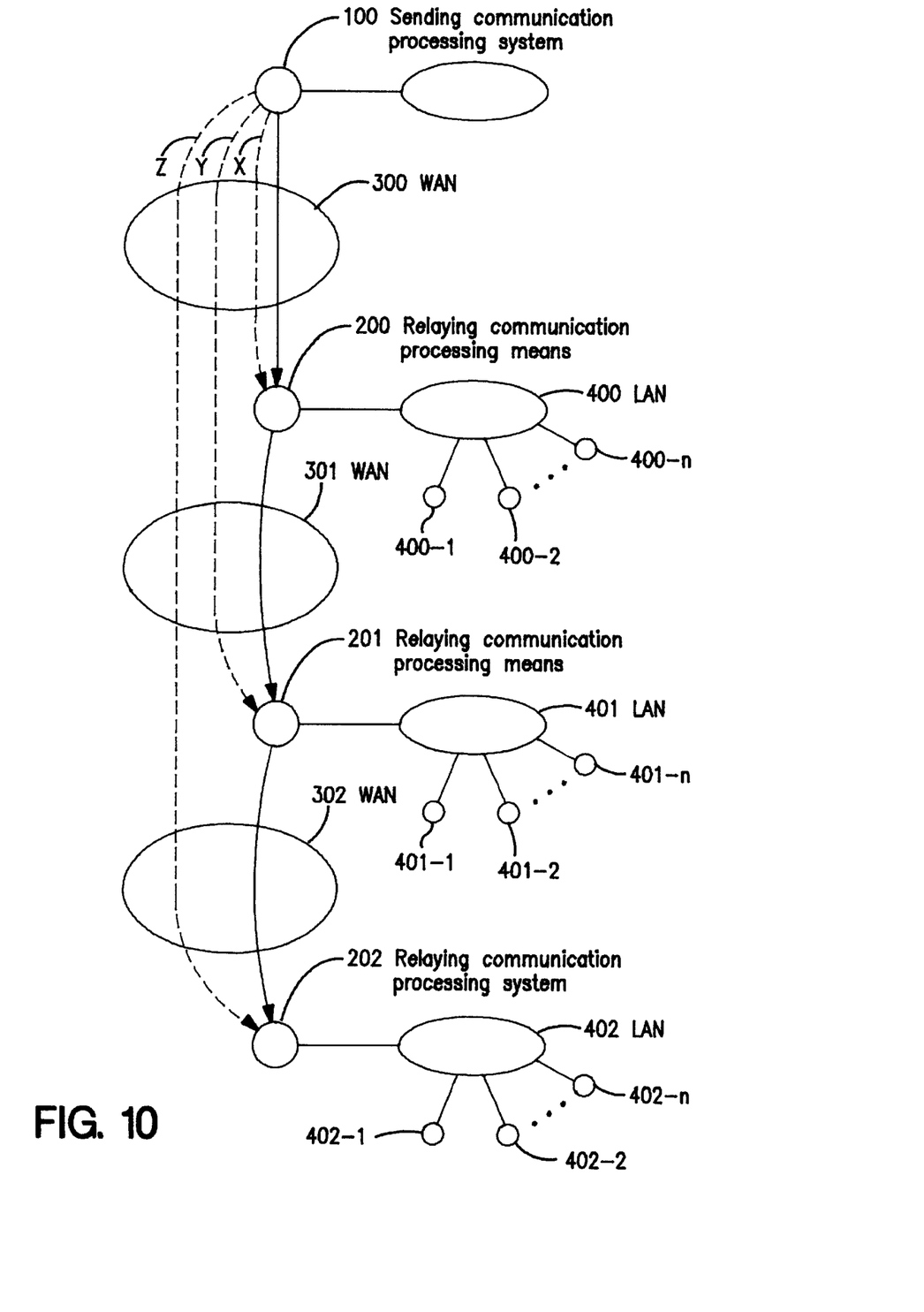
FIG. 10 is an illustration of the effects of the present invention.

For example, even in cases where the communication processing systems to which a file is broad-cast from a sending communication processing system 100 are communication processing systems 400-1 through 400-n, 401-1 through 401-n and 402-1 through 402-n which are connected to LANs 400, 401 and 402, respectively, with a WAN 300 located between the communication processing system 100 and the LAN 400, a WAN 301 located between the LAN 400 and the LAN 401 and a WAN 302 located between the LAN 401 and the LAN 402, as illustrated in FIG. 10, the present invention minimizes the communications time and communications cost of the entire system, since only sending of the file from the sending communication processing system 100 to the relaying communication processing system 200 via the WAN 300 allows the file to be broadcasted to the relaying communication processing systems 400-1 through 400-n, 401-1 through 401-n and 402-1 through 402-n for which the relaying communication processing systems 200, 201 and 202 are responsible for directly delivering the file, respectively, by sending the file from the relaying communication processing system 200 to the relaying communication processing system 201 via the WAN 301, and from the relaying communication processing system 201 to the relaying communication processing system 202 via the WAN 302.

On the other hand, according to the prior art, much communications time and cost are spent, since, for example, in cases where a file is intended to be broadcasted from the sending communication processing system 100 to the communication processing systems 400-1 through 400-n, 401-1 through 401-n and 402-1 through 402-n, the file must be sent to the relaying communication-processing system 200 via the WAN 300, to the relaying communication processing system 201 via the WANs 300 and 301, and to the relaying communication processing system 202 via the WANs 300, 301 and 302, as indicated by the broken lines X, Y and Z in FIG. 10.

A program, which causes a computer to execute a procedure relating to a file transfer method of the invention, is stored in a computer-readable storage device, i.e. a memory, a magnetic disk, an optical disk, a floppy disk and CD-ROM etc.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A file transfer system for broadcasting a file from a sending communication processing system to a plurality of receiving communication processing systems via at least one relaying communication processing system, which comprises:

said sending communication processing system which includes first file destination-sorting means and first file transfer processing means, wherein said first file destination-sorting means inputs a broadcast request, including the name of a file to be broadcast and a plurality of file destinations, and determines at least one relaying communication processing system to which said file is to be sent, and said first file transfer processing means sends the file and the plurality of destinations to which said file is sent, to each of the relaying communication processing systems determined by said first file destination-sorting means;

said relaying communication processing systems each having second file destination-sorting means and second file transfer processing means, wherein said second file destination-sorting means determines, for the destinations which indicate said receiving communication processing systems to which the relaying communication processing system sends the file from among the plurality of file destinations sent from said sending communication processing system, the lower-order relaying communication processing systems to which said file are to be sent on the basis of said destinations, and said second file transfer processing means sends, for the destinations which indicate said receiving communication processing systems to which the relaying communication processing system sends the file from among the plurality of file destinations sent from said sending communications processing system, the file to said receiving communication processing systems, and for the file destinations which indicate communication processing systems which are not said receiving communication processing systems to which the relaying communication processing system sends the file, sends the received file and the destinations of said file to the lower-order relaying communication processing systems determined by said second file destination-sorting means;

said sending communication processing system comprising a first relay information table which stores the relay information indicating the relationship between the destinations to which the sending communication processing system may send the file and said relaying communication processing systems to which said file is sent;

said first file destination-sorting means inputs a broadcast request, including the name of the file to be broadcast and a plurality of destinations to which said file is sent, and determines at least one lower-order relaying communication processing system to which the file designated in said broadcast request is to be sent, on the basis of the relay information stored in said first relay information table and the plurality of destinations included in said broadcast request;

said relaying communication processing systems each comprising a connection information table which stores the connection information indicating the relationship between the relaying communication processing system and said at least one receiving communication processing system to which the relaying communication processing system sends the file, and a second relay information table which stores the relay information indicating the relationship between at least one destination to which the relaying communication processing system may send the file and said lower-order relaying communication processing system to which said file is sent;

said second file destination-sorting means determines, for the destinations which indicate communication processing systems which are not the communication processing systems included in the connection information stored in said connection information table, of the plurality of the destinations sent from said sending communication processing system, at least one lower-order relaying communication processing system to which said file is to be sent, on the basis of said destinations and the relay information stored in said relay information table; and the second file transfer processing means sends, for the destinations which indicate the communication processing systems included in the connection information stored in said connection information table, of the plurality of destinations sent from said sending communication processing system, the file to said receiving communication processing systems indicated by said destinations, and for the destinations which indicate communication processing systems which are not said receiving communication processing systems to which the relaying communication processing system sends the file, sends the received file and the destinations of said file to the lower-order relaying communication processing systems determined by said second file destination-sorting means.

2. A file transfer method of broadcasting a file from a sending communication processing system to a plurality of receiving communication processing systems via at least one relaying communication processing system, which comprises the steps of:

inputting a broadcast request, including the name of a file to be broadcast and a plurality of destinations to which said file is to be sent, determining at least one relaying communication processing system to which said file is to be sent, and sending said file and the plurality of destinations to which said file is sent, to each of the determined relaying communication processing systems, by said sending communication processing system;

sending, for the destinations which indicate said receiving communication processing systems to which the relaying communication processing system sends the file from among the plurality of destinations sent from said sending communication processing system, the file to said receiving communication processing systems, and for the other destinations, determining at least one relaying communication processing system to which said file is to be sent on the basis of said destinations, and sending the received file and the plurality of destinations to which said file is sent, to each of the determined relaying communication processing systems, by said relaying communication processing system;

the sending communication processing system holds the relay information indicating the relationship between at least one file destination to which the sending communication processing system may send the file and the relaying communication processing system to which said file is sent, inputs a broadcast request, including the name of the file to be broadcast and a plurality of destinations to which said file is sent, and determines at least one relaying communication processing system to which the file designated in said broad-cast request is to be sent, on the basis of said relay information and the plurality of destinations included in said broadcast request, to send said file and the plurality of destinations to which said file is sent, to each of the determined relaying communication processing systems; and said relaying communication processing systems each hold the connection information indicating the relationship between the relaying communication processing system and said receiving communication processing system to which the relaying communication processing system sends the file, and the relay information indicating the relationship between at least one destination to which the relaying communication processing system may send the file and said relaying communication processing system to which said file is sent, and send, for the destinations which indicate the communication processing systems included in said connection information from among the plurality of destinations sent from said sending communication processing system, the file to said receiving communication processing systems indicated by said destinations, and for the other destinations, determine at least one relaying communication processing system to which said file is to be sent on the basis of said destinations and on said relay information, and send the received file and the plurality of destinations to which said file is sent, to each of the determined relaying communication processing systems.

3. A computer-readable storage medium which stores:

a program for the execution by the file-sending communication processing system of the process of inputting a broadcast request, which includes the name of a file to be broadcast and a plurality of destinations to which said file is to be sent, determining at least one relaying communication processing system to which said file is to be sent, and sending said file and the plurality of destinations to which said file is sent, to each of the determined relaying communication processing systems;

a program for the execution by at least one relaying communication processing system of the process of sending, for the destinations which indicate the receiving communication processing systems to which the sending communication processing system sends the file from among the plurality of destinations sent from said sending communication processing system, the file to said receiving communication processing systems, and for the other destinations, determining at least one relaying communication processing system to which said file is to be sent on the basis of said destinations, and sending the receiving file and the plurality of destinations to which said file is sent, to each of the determined relaying communication processing systems, by the at least one relaying communication processing system;

a program for the execution by the sending communication processing system of the process of holding the relay information indicating the relationship between at least one destination to which the sending communication processing system may send the file and the relaying communication processing system to which said file is sent, inputting a broadcast request, which includes the name of the file to be broadcast and a plurality of destinations to which said file is to be sent, and determining at least one relaying communication processing system to which the file designated in said broadcast request is to be sent, on the basis of said relay information and the plurality of destinations included in said broadcast request, to send said file and the plurality of destinations to which said file is sent, to each of the determined relaying communication processing systems; and a program for the execution by the relaying communication processing system of the process of holding the connection information indicating the relationship between the relaying communication processing system and said receiving communication processing system to which the relaying communication processing system sends the file, and the relay information indicating the relationship between at least one destination to which the relaying communication processing system may send the file and said relaying communication processing system to which said file is sent, and for the destinations indicating the communication processing systems included in said connection information of the plurality of destinations sent from said sending communication processing system, sending the file to said receiving communication processing systems indicated by said destinations, and for the other destinations, determining at least one lower-order relaying communication processing system to which said file is to be sent, on the basis of said destinations and said relay information, and sending the received file and the plurality of destinations to which said file is sent, to each of the determined relaying communication processing systems.

* * * * *